United States Patent
Barthel et al.

(10) Patent No.: US 6,183,867 B1
(45) Date of Patent: Feb. 6, 2001

(54) SILICON DIOXIDE WHICH BEARS PARTIALLY OR FULLY SILYLATED POLYSILICIC ACID CHAINS ON ITS SURFACE

(75) Inventors: Herbert Barthel, Emmerting; Mario Heinemann, Burghausen, both of (DE)

(73) Assignee: Wacker-Chemie GmbH, München (DE)

( * ) Notice: Under 35 U.S.C. 154(b), the term of this patent shall be extended for 0 days.

(21) Appl. No.: 09/212,612

(22) Filed: Dec. 16, 1998

(51) Int. Cl.$^7$ ........................................................ B32B 5/16
(52) U.S. Cl. ........................... 428/403; 428/404; 428/407
(58) Field of Search ..................... 428/403, 404, 428/405

(56) References Cited

U.S. PATENT DOCUMENTS

| | | | |
|---|---|---|---|
| 3,837,878 | | 9/1974 | Beers . |
| 3,953,487 | * | 4/1976 | Kratel et al. ................. 556/453 |
| 4,017,528 | * | 4/1977 | Unger et al. ................. 556/457 |
| 4,174,338 | * | 11/1979 | Goller et al. ................. 524/863 |
| 4,344,800 | * | 8/1982 | Lutz .......................... 106/308 |
| 4,849,022 | * | 7/1989 | Kobayashi et al. ........... 106/490 |
| 4,950,634 | * | 8/1990 | Williams et al. ............ 502/401 |
| 5,013,772 | | 5/1991 | Fujiki et al. . |
| 5,057,151 | * | 10/1991 | Schuster et al. ................ 106/2 |
| 5,330,836 | * | 7/1994 | Buese et al. ................. 428/405 |
| 5,372,795 | | 12/1994 | Mühlhofer et al. . |
| 5,486,420 | * | 1/1996 | Nishihara et al. ........... 428/405 |
| 5,686,054 | | 11/1997 | Barthel et al. . |
| 5,686,550 | * | 11/1997 | Noto et al. .................... 528/39 |
| 5,900,315 | * | 5/1999 | Little ........................ 428/405 |
| 5,902,226 | * | 5/1999 | Tasaki et al. ................. 516/34 |
| 5,932,679 | * | 8/1999 | Noto et al. .................... 528/39 |
| 5,959,005 | * | 9/1999 | Hartmann et al. ............ 523/213 |

FOREIGN PATENT DOCUMENTS

| | | |
|---|---|---|
| 1 163 784 | 2/1964 | (DE) . |
| 2 107 082 | 8/1971 | (DE) . |
| 23 44 388 B2 | 6/1978 | (DE) . |
| 24 03 783 C2 | 10/1982 | (DE) . |
| 32 11 431 A1 | 9/1983 | (DE) . |
| 38 39 900 A1 | 5/1990 | (DE) . |
| 42 40 741 A1 | 6/1994 | (DE) . |
| 44 19 234 A1 | 12/1995 | (DE) . |
| 0 342 025 | 11/1989 | (EP) . |
| 0 460 665 A1 | 12/1991 | (EP) . |
| 0 378 785 B1 | 4/1993 | (EP) . |
| 2 211 516 | 12/1973 | (FR) . |
| 2 635 782 | 8/1989 | (FR) . |

OTHER PUBLICATIONS

Derwent Abstract (#71–555505/34) corresponding to DE 2 107 082.
CD–Rom Paj Patent Abstracts of Japan JP 08259216A.
CD–Rom Paj: Patent Abstract of Japan JP 07010524A.
Derwent Abstract (#75–55793W/34) corresponding to DE 24 03 783.
Derwent Abstract (#83–777868/40) corresponding to DE 32 11 431.
Derwent Abstract (#75–17818W/11) corresponding to DE 23 44 388.

* cited by examiner

*Primary Examiner*—Hoa T. Le
(74) *Attorney, Agent, or Firm*—Brooks & Kushman P.C.

(57) ABSTRACT

The invention relates to silicon dioxide which bears partially or fully silylated polysilicic acid chains on its surface, wherein the sum of silanol groups of the silicon dioxide surface (SiOH) and grafted-on silylating agent radicals ($SiR_a$) is greater than the number of silanol groups on the surface of untreated silicon dioxide, where a can be 1, 2 or 3 and R can be identical or different and are each a substituted or unsubstituted hydrocarbon radical.

17 Claims, No Drawings

SILICON DIOXIDE WHICH BEARS PARTIALLY OR FULLY SILYLATED POLYSILICIC ACID CHAINS ON ITS SURFACE

TECHNICAL FIELD

The invention relates to silicon dioxide which bears partially or fully silylated polysilicic acid chains on its surface and to a process for its preparation, and also to toners and silicone elastomers in which it is present.

BACKGROUND ART

DE 1163784 and DE 3211431, DEGUSSA AG, describes processes for hydrophobicizing silicon dioxide at elevated temperature. For this purpose, the silicon dioxide is activated and predried at high temperatures, giving a hydrophobic product.

DE 4240741, Wacker-Chemie GmbH, describes a process for silylating silicon dioxide with chlorosilanes with addition of lower alkyl alcohols. A uniformly hydrophobic product is obtained.

DE 2344388, Wacker-Chemie GmbH, describes a process for hydrophobicizing silicon dioxide with mechanical compaction. A completely hydrophobic material is obtained.

DE 2403783, BAYER AG, describes a process for preparing a silicon dioxide filler for use in silicone compositions. A completely hydrophobic silica is obtained.

DE 3839900 and EP 0378785, Wacker-Chemie GmbH, describe a process for hydrophobicizing a particulate solid containing Si—OH groups by means of hydrophobicizing agents. This gives a hydrophobic filler which is suitable for use in curable compositions based on diorganopolysiloxanes.

The prior art products are, in general, homogeneously hydrophobic, and are not well suited for some applications. Partially or fully silylated polysilicic acid chains on a silicon dioxide surface have not been previously prepared.

DISCLOSURE OF INVENTION

It is an object of the invention to overcome the disadvantages of the prior art by providing silicon dioxide which bears partially or fully silylated polysilicic acid chains on its surface, wherein the sum of silanol groups of the silicon dioxide surface (SiOH) and grafted-on silylating agent radicals ($SiR_a$) is greater than the number of silanol groups on the surface of untreated silicon dioxide, where a can be 1, 2 or 3 and the R groups can be identical or different and are each a substituted or unsubstituted hydrocarbon radical.

DETAILED DESCRIPTION OF THE PREFERRED EMBODIMENTS

The hydrophobicization of silicon dioxide, in particular pyrogenic silicon dioxide, is practiced as described by the prior art, by the reaction of the silanol groups of silicon dioxide with organosilicon radicals. Thus, according to the prior art, the hydrophobicization proceeds as a condensation reaction between the silanol groups of the silicon dioxide with SiX groups (X is a reactive leaving group) of a silylating agent. As a consequence, the hydrophobicized silicon dioxide has fewer silanol groups on its surface than the initial, hydrophilic silicon dioxide which has at most two silanol groups per $nm^2$ of silicon dioxide surface.

The silicon dioxide of the invention has chemically bound, partially or fully silylated polysilicic acids on its surface. The silylating agent layer therefore comprises partially or fully silylated polysilicic acid structures which are bound to the silicon dioxide surface and comprise units of the structure $R_a(OH)_bSiO_c$ and $(OH)_dSiO_e$, where R can be identical or different and are preferably each a substituted or unsubstituted hydrocarbon radical, a is 1, 2 or 3, preferably 3, b is 0, 1 or 2, preferably 0, and c is 1, 2 or 3, preferably 1, where a+b+c is 4, d is 0, 1, 2 or 3, preferably 0, 1 or 2, e is 1, 2, 3 or 4 and d+e is 4.

Preferably, R are identical or different, substituted or unsubstituted hydrocarbon radicals having from 1 to 18 carbon atom(s), and may be saturated or unsaturated aliphatic, or aromatic, preferably substituted by halogen or pseudohalogen.

Examples of R are alkyl radicals such as the methyl radical, the ethyl radical; propyl radicals such as the iso- or n-propyl radical; butyl radicals such as the t- or n-butyl radical; pentyl radicals such as the neo-, iso- or n-pentyl radical; hexyl radicals such as the n-hexyl radical; heptyl radicals such as the n-heptyl radical; octyl radicals such as the 2-ethylhexyl or n-octyl radical; decyl radicals such the n-decyl radical; dodecyl radicals such as the n-dodecyl radical; hexadecyl radicals such as the n-hexadecyl radical; and octadecyl radicals such as the n-octadecyl radical; alkenyl radicals such as the vinyl, 2-allyl, and 5-hexenyl radicals; aryl radicals such as the phenyl, biphenyl, and naphthenyl radicals; alkylaryl radicals such as the benzyl, ethylphenyl, tolyl, and xylyl radicals; halogenated alkyl radicals such as the 3-chloropropyl, 3,3,3-trifluoropropyl, and perfluorohexylethyl radicals; and halogenated aryl radicals such as the chlorophenyl and chlorobenzyl radicals.

Preferred examples of R are, for reasons of industrial availability, the methyl radical, the vinyl radical and the 3,3,3-trifluoropropyl radical.

The content of active and acid SiOH on the $SiO_2$ surface of the silicon dioxide of the invention is preferably less than 25 mol %, based on the total content of active and acid SiOH of an untreated hydrophilic silicon dioxide.

The partially or fully silylated polysilicic acid structures which are chemically bound to the silicon dioxide surface preferably contain at least two and at most 20 Si atoms.

The molar proportion of the partially or fully silylated polysilicic acid structures which are bound to the silicon dioxide surface and comprise units of the structure $R_a(OH)_bSiO_c$ in the total silylating agent layer is less than or equal to 75 mol %, but greater than or equal to 25 mol %, where R, a, b and c are as defined above.

Examples of silylated polysilicic acid radicals on the silicon dioxide surface are set forth below. In these formulae, Z is a silicon atom of the silicon dioxide surface. The silicon dioxide surface is preferably not occupied by merely one type of silylated polysilicic acid radical, but by a variety of silylated polysilicic acid radicals.

Z—O—Si[$OSiR_3$]$_3$

Z—O—SiOH[$OSiR_3$]$_2$

Z—O'Si(OH)$_2$[$OSiR_3$]

{Z—O—}$_2$Si[OSiR$_3$]$_2$
{Z—O—}$_2$SiOH[OSiR$_3$]
Z—O—Si[OSiR$_3$]$_2$—O—Si[OSiR$_3$]$_3$
Z—O—SiOH[OSiR$_3$]—O—Si[OSiR$_3$]$_3$
Z—O—Si(OH)$_2$—O—Si[OSiR$_3$]$_3$
Z—O—Si[OSiR$_3$]$_2$—O—SiOH[OSiR$_3$]$_2$
Z—O—Si[OSiR$_3$]$_2$—O—Si(OH)$_2$[OSiR$_3$]
Z—O—SiOH[OSiR$_3$]—O—SiOH[OSiR$_3$]$_2$
Z—O—Si{OSi[OSiR$_3$]$_3$}$_3$
Z—O—SiOH{OSi[OSiR$_3$]$_3$}$_2$
Z—O—Si{OSiOH{OSiR$_3$]$_2$}$_3$, where R are identical or different and are as defined above.

Preferred examples are:
Z—O—Si[OSi(CH$_3$)$_3$]$_3$
Z—O—SiOH[OSi(CH$_3$)$_3$]$_2$
Z—O—Si(OH)$_2$[OSi(CH$_3$)$_3$]
{Z—O—}$_2$Si[OSi(CH$_3$)$_3$]$_2$
{Z—O—}$_2$SiOH[OSi(CH$_3$)$_3$]
Z—O—Si[OSi(CH$_3$)$_3$]$_2$—O—Si[OSi(CH$_3$)$_3$]$_3$
Z—O—SiOH[OSi(CH$_3$)$_3$]—O—Si[OSi(CH$_3$)$_3$]$_3$
Z—O—Si(OH)$_2$—O—Si[OSi(CH$_3$)$_3$]$_3$
Z—O—Si[OSi(CH$_3$)$_3$]$_2$—O—SiOH[OSi(CH$_3$)$_3$]$_2$
Z—O—Si[OSi(CH$_3$)$_3$]$_2$—O—Si(OH)$_2$[OSi(CH$_3$)$_3$]
Z—O—SiOH[OSi(CH$_3$)$_3$]—O—SiOH[OSi(CH$_3$)$_3$]$_2$
Z—O—Si{OSi[OSi(CH$_3$)$_3$]$_3$}$_3$
Z—O—SiOH{OSi[OSi(CH$_3$)$_3$]$_3$}$_2$
Z—O—Si{OSi[OSiOH(CH$_3$)$_3$]$_2$}$_3$ The invention further provides a process for preparing silicon dioxide which bears partially or fully silylated polysilicic acid chains on its surface, wherein the silylating agent is added in a molar excess, based on the silanol groups present on the silicon dioxide.

The silicon dioxides used in the process of the invention are preferably silicon dioxides such as silicon dioxide prepared by wet chemical precipitation or, particularly preferably, pyrogenic silicon dioxide prepared by flame hydrolysis, e.g. from tetrachlorosilane or methyltrichlorosilane or methyldichlorosilane. The silicon dioxides which are preferably used have a hydrodynamic diameter of the silicon dioxide aggregates of less than 10 µm, preferably less than 1 µm, particularly in the size range from 100 to 1000 nm; preference is given to using those having a specific surface area of greater than 0.1 m$^2$/g, particularly preferably from 20 m$^2$/g to 400 m$^2$/g (measured by the BET method in accordance with DIN 66131 and 66132). Hydrophilic and hydrophobic silicon dioxides can be used.

The silylating agents used in the process of the invention are preferably organosilicon compounds of the structure $$R_fSiX_g$$

where f is 1, 2 or 3, preferably 3,
g is 1, 2 or 3
and f+g is 4,
X is a reactive group or a hydrolyzable group on the silicon atom, for example a halogen atom such as —Cl, a pseudohalogen group such as —CN, —NCO, —NCS or —N$_3$, an alkoxy group or an amino group, preferably an alkoxy group having from 1 to 8 carbon atom(s), e.g. O-methyl, O-ethyl, O-propyl, O-butyl, preferably O-methyl or O-ethyl, or $$[R_hSi]_iY$$

where h is 3,
i is 1 or 2
and Y is O or NR$^1_{3-i}$, preferably NH, where R$^1$ is hydrogen or an alkyl radical having 1–8 carbon atom (s), or oligomeric or polymeric organosilicon compounds built up of units of the structure $$[R_jSiY]$$

where j is 1, 2 or 3, preferably 2,
and Y is as defined above, preferably O,
where these organosilicon compounds have a viscosity of up to 100 mPas and preferably additionally contain an OH group, particularly preferably 2 or more OH groups, and
R is as defined above.

Preferred examples of silylating agents are trimethylmethoxysilane, trimethylethoxysilane, hexamethyldisilazane, bis(vinyldimethyl)disilazane or bis (3,3,3-trifluoropropyl-dimethyl)disilazane.

Preference is given to using mixtures of silylating agents and oxygen-containing organosilicon compounds. Preference is given to those oxygen-containing organosilicon compounds which are themselves subjected to a silylation reaction but in a molar proportion of less than 25%. Examples of such oxygen-containing organosilicon compounds are dimeric, oligomeric or polymeric polydimethylsiloxanes of the formula (CH$_3$)$_3$SiO—[(CH$_3$)$_2$SiO]$_x$—SiCH$_3$ or [(CH$_3$)$_2$SiO]$_x$ where x<100, preferably x<10.

A particularly preferred mixture of silylating agents with oxygen-containing organosilicon compounds consists of hexamethyldisilazane and hexamethyldisiloxane.

Additives are preferably present in the silylation, for example water and preferably bases, for example, such as inorganic bases, e.g. ammonia or alkali metal or alkaline earth metal hydroxides or carbonates, or organic bases such as alkylamines, e.g. methylamine, ethylamine or isooctylamine, or arylamines such as pyridine. Preferably ammonia, and also, if desired, solvents such as aliphatic alcohols, e.g. methanol, ethanol, n-propanol, iso-propanol, n- or iso-butanol, or alcohol/water mixtures, ethers such as diethyl ether or tetrahydrofuran, ketones such as methyl isobutyl ketone, and hydrocarbons such as n-hexane, cyclohexane, toluene or mineral oils, are used.

Reactant Ratios:

100 parts by weight of silicon dioxide are reacted, per 100 m$^2$/g of its specific surface area, with at least 5 parts by weight of water and 5 parts by weight of silylating agent for each 100 g/mol of molecular weight of the silylating agent. Preference is given to greater than 10 parts by weight of water or 10 parts by weight of silylating agent for each 100 g/mol of molecular weight of the silylating agent. Based on the silylating agent, preferably at least 10 mol %, preferably 25 mol %, particularly preferably 50 mol %, of base should be present during the silylation. This can be achieved by adding additional base or by elimination of base from the silylating agent during the silylation reaction or in prereactions to the silylation reaction. The ratio of the oxygen-containing organosilicon compounds to silylating agent is preferably from 10 mol % to a 10-fold excess. Preference is given to from 50 mol % to 250 mol %.

Reaction Parameters:

The reaction time at room temperature is at least 15 minutes, at higher temperatures correspondingly less, at lower temperatures correspondingly more. The reaction temperature is greater than 0° C., preferably room temperature, particularly preferably greater than 40° C. in which case it should be below the boiling point of the individual components (or their mixtures) of the silylation. Preferred reaction times are greater than or equal to 1 hour at T=40° C. Particularly preferred reaction times are greater than or equal to 2 hours at T=60° C. The reaction pressure is preferably from atmospheric pressure to 10 bar, particularly preferably from 1 to 2 bar.

The silicon dioxide of the invention is preferably used as a thickener, and as rheological additive in liquids, polymers or resins for developing non-Newtonian rheology, yield point, and thixotropy.

Furthermore, the silicon dioxide of the invention may be used as thickener and rheological additive and as a reinforcing filler in silicone rubbers of the condensation-crosslinking type, e.g. condensation-crosslinking 1-component or 2-component systems, in silicone rubbers of the addition-crosslinking type and in silicone rubbers of the peroxide-crosslinking type. It can also be used as a flow aid in pulverulent solids such as fire extinguishing powers and as flow aid and charge regulator in pulverulent solids such as dry toners, for example 1-component or 2-component toners. In addition, it can be used in antifoams.

Advantages of the silicon dioxide of the invention include improved rheological properties of silicone rubbers filled with this silicon dioxide; improved mechanical properties of crosslinked silicone elastomers; improved transparency of filled silicone elastomers; and improved flow properties and improved charging properties of dry toners mixed with this silicon dioxide. Furthermore, the stability of toners over long periods of stress is improved, which also means that more copies can be obtained with the same amount of toner, since the silicon dioxide adheres better to the toner surface.

EXAMPLES

Example 1

100 g of a pyrogenic silicon dioxide having a specific BET surface area of 200 $m^2/g$ (commercially available from Wacker under the name HDK N20), 40 g of water, 40 g of hexamethyldisilazane, and 20 g of hexamethyldisiloxane are intensively mixed and subsequently reacted at 60° C. for 24 hours. The pulverulent reaction mixture is subsequently freed of excess water, ammonia and volatile silicon compounds at 150° C. for 2 hours in a gentle stream of nitrogen. A white powder is obtained.

Example 2

100 g of a pyrogenic silicon dioxide having a specific BET surface area of 125 $m^2/g$ (commercially available from Wacker under the name HDK S13), 25 g of water, 25 g of hexamethyldisilazane and 12 g of hexamethyldisiloxane are intensively mixed and subsequently reacted at 60° C. for 24 hours. The pulverulent reaction mixture is subsequently freed of excess water, ammonia and volatile silicon compounds at 150° C. for 2 hours in a gentle stream of nitrogen. A white powder is obtained.

Example 3

100 g of a pyrogenic silicon dioxide having a specific BET surface area of 300 $m^2/g$ (commercially available from Wacker under the name HDK T30), 60 g of water, 60 g of hexamethyldisilazane and 30 g of hexamethyldisiloxane are intensively mixed and subsequently reacted at 60° C. for 24 hours. The pulverulent reaction mixture is subsequently freed of excess water, ammonia and volatile silicon compounds at 150° C. for 2 hours in a gentle stream of nitrogen. A white powder is obtained.

Example 4

100 g of a pyrogenic silicon dioxide having a specific BET surface area of 300 $m^2/g$ (commercially available from Wacker under the name HDK T30), 60 g of water, 120 g of bis(3,3,3-trifluoropropyldimethyl)disilazane and 30 g of hexamethyldisiloxane are intensively mixed and subsequently reacted at 60° C. for 24 hours while stirring. The pulverulent reaction mixture is subsequently freed of excess water, ammonia and volatile silicon compounds at 200° C. for 2 hours in a gentle stream of nitrogen. A white powder is obtained.

Example 5

100 g of a pyrogenic silicon dioxide having a specific BET surface area of 300 $m^2/g$ (commercially available from Wacker under the name HDK T30), 60 g of water, 35 g of bis(vinyldimethyl)disilazane, 35 g of hexamethyldisilazane and 30 g of hexamethyldisiloxane are intensively mixed and subsequently reacted at 60° C. for 24 hours while stirring. The pulverulent reaction mixture is subsequently freed of excess water, ammonia and volatile silicon compounds at 170° C. for 2 hours in a gentle stream of nitrogen. A white powder is obtained.

Example 6

100 g of a pyrogenic silicon dioxide having a specific BET surface area of 200 $m^2/g$ (commercially available from Wacker under the name HDK N20), 40 g of water and 40 g of hexamethyldisilazane are intensively mixed and subsequently reacted at 60° C. for 24 hours. The pulverulent reaction mixture is subsequently freed of excess water, ammonia and volatile silicon compounds at 150° C. for 2 hours in a gentle stream of nitrogen. A white powder is obtained.

Example 7

100 g of a pyrogenic silicon dioxide having a specific BET surface area of 200 $m^2/g$ (commercially available from Wacker under the name HDK N20), 40 g of water, 42 g of trimethylmethoxysilane, and 14 g of a 25% strength solution of ammonia and water are intensively mixed and subsequently reacted at 60° C. for 24 hours. The pulverulent reaction mixture is subsequently freed of excess water, methanol, ammonia and volatile silicon compounds at 150° C. for 2 hours in a gentle stream of nitrogen. A white powder is obtained.

Comparative Example C1

100 g of a pyrogenic silicon dioxide having a specific BET surface area of 200 $m^2/g$ (commercially available from Wacker under the name HDK N20), 40 g of water, 40 g of hexamethyldisilazane, and 20 g of hexamethyldisiloxane are intensively mixed and subsequently reacted at 40° C. for 5 minutes. The pulverulent reaction mixture is subsequently freed of excess water, ammonia and volatile silicon compounds at 150° C. for 2 hours in a gentle stream of nitrogen. A white powder is obtained.

Comparative Example C2

100 g of a pyrogenic silicon dioxide having a specific BET surface area of 200 $m^2/g$ (commercially available from Wacker under the name HDK N20), 40 g of water, and 42 g of trimethylmethoxysilane are intensively mixed and subsequently reacted at 60° C. for 24 hours. The pulverulent reaction mixture is subsequently freed of excess water, methanol and volatile silicon compounds at 150° C. for 2 hours in a gentle stream of nitrogen. A white powder is obtained.

Summary of the analytical data for the silicon dioxide from Examples 1 to 7 and C1 to C2:

TABLE 1

| Example | Silylating agent radicals[1] per nm$^2$ of silicon dioxide surface | Silicon dioxide-silanol groups per nm$^2$ of silicon dioxide surface | Sum of silylating agent radicals and silicon dioxide-silanol groups per nm$^2$ of silicon dioxide surface | Silicon Dioxide Surface Area in m$^2$/g[2] |
|---|---|---|---|---|
| HDK N20 | — | 1.9 | 1.9 | 200 |
| Example 1 | 5.3 | 0.5 | 5.8 | 79 |
| HDK S13 | — | 1.8 | 1.8 | 125 |
| Example 2 | 4.9 | 0.4 | 5.3 | 50 |
| HDK T30 | — | 1.9 | 1.9 | 300 |
| Example 3 | 5.7 | 0.5 | 6.2 | 121 |
| Example 4 | 4.2 | 0.4 | 4.6 | 129 |
| Example 5 | 5.1 | 0.6 | 5.7 | 120 |
| Example 6 | 3.6 | 0.6 | 4.2 | 109 |
| Example 7 | 5.2 | 0.5 | 5.7 | 83 |
| Comp. Ex. C1 | 1.4 | 0.5 | 1.9 | 129 |
| Comp Ex. C2 | 0.9 | 0.9 | 1.8 | 154 |

[1]Silylating agent radical in Examples 1–7 and Comparative Examples C1 and C2.
[2]Measured by the BET method in accordance with DIN 66131 and 66132

Example 10

Five compositions, each containing 50 g of a ferrite carrier having a mean particle diameter of 80 μm are prepared by mixing the carrier at room temperature with 0.5 g of the silicon dioxides from Examples 1–5 by shaking in a 100 ml polyethylene container for 15 minutes. Prior to measuring the charging behavior, the compositions are activated for 5 minutes at 64 rpm in a closed 100 ml polyethylene container on a set of rollers. Using a hard-blow-off cell (about 3 g of silicon dioxide, capacitance 10 nF, 45 μm sieve, air flow 1 l/min, air pressure 2.4 kPa, measurement time 90 sec.) (EPPING GmbH, D-85375 Neufahrn), the triboelectric charging behavior of the silicon dioxide is measured as the silicon dioxide charge per unit mass of silicon dioxide (q/m).

TABLE 2

| Example | Charging behavior q/m against ferrite [μC/g] |
|---|---|
| Example 1 | −420 |
| Example 2 | −380 |
| Example 3 | −430 |
| Example 4 | −290 |
| Example 5 | −360 |

Example 11

500 g of a vinyl-terminated polydimethyl-siloxane polymer having a viscosity of 20,000 mm$^2$/s at 25° C. are heated to 150° C. in a laboratory kneader. 400 g of silicon dioxide prepared as described in Example 3 are added and subsequently mixed in by kneading. While kneading, volatile constituents are removed at 150° C. and 1000 hPa over a period of one hour. This gives a stiff phase which is subsequently diluted by further addition of 400 g of a vinyl-terminated polydimethylsiloxane polymer having a viscosity of 20,000 mm$^2$/s at 25° C. A component A and a component B are prepared from this base composition.

Preparation of component A: 380 g of the base composition, 0.2 g of a platinum bis(vinyldimethyl) disiloxane complex catalyst, and 1 g of ethynylcyclohexanol inhibitor are mixed at room temperature and p=1000 hPa for 0.5 hour.

Preparation of component B: 380 g of the base composition, 18 g of a linear methyl-H-polysiloxane having a viscosity of 400 mm$^2$/s at 25° C. and an Si—H content of 0.5 mol % as crosslinker, and 1 g of ethynylcyclohexanol inhibitor are mixed at room temperature and p=1000 hPa for 0.5 hour.

For crosslinking, the components A and B are mixed in a ratio of 1:1 and crosslinked at a temperature of 160° C. After vulcanization and heating at 200° C. for 4 hours, the Shore A hardness, the tensile strength, the elongation at break and the tear propagation resistance are measured and the transparency is assessed.

TABLE 3a

| Viscosity of the base composition | 110 Pas |
|---|---|
| Appearance of the base composition | clear and transparent |

TABLE 3b

| Shore A hardness | 30 |
|---|---|
| Tensile strength | 9 N/mm$^2$ |
| Elongation at break | 680% |
| Tear propagation resistance | 33 N/mm |
| Appearance | clear and transparent |

Example 12

100 g of a magnetic 1-component dry toner, negatively charged variety, "crushed type", based on styrene-methacrylate copolymer, which is free of silicon dioxide and has a mean particle size of 14 μm, (e.g. obtainable from IMEX, Japan) are mixed at room temperature with 0.4 g of a silicon dioxide prepared as described in Example 2 in a tumble mixer, (e.g. Turbular) for 1 hour. After subjecting the toner to conditions as in a photocopier for 20 minutes (corresponding to 1000 copying cycles), the charge (charge per unit mass) of the finished toner containing silicon dioxide and its flow behavior (mass flow) to the development roll are determined in a "q/m-mono" electrometer/flow tester (EPPING GmbH, D-85375 Neufahrn).

TABLE 4

| Example | Toner charge [μC/g] | Flow behavior [mg] |
|---|---|---|
| Toner free of silicon dioxide | −1.50 | 2 |
| Example 1 | −1.71 | 36 |
| Example 2 | −1.65 | 33 |
| Example 3 | −1.89 | 38 |
| Example 4 | −1.75 | 45 |
| Example 5 | −1.73 | 42 |

What is claimed is:
1. Treated silicon dioxide which bears partially or fully silylated polysilicic acid chains on its surface, wherein the sum of silanol groups of the treated silicon dioxide surface (SiOH) and grafted-on silylating agent radicals (SiR$_a$) is greater than the number of silanol groups on the surface of untreated silicon dioxide, where a can be 1, 2 or 3 and R can be identical or different and are each a substituted or unsubstituted hydrocarbon radical.

2. Treated silicon dioxide treated as claimed in claim 1, wherein the partially or fully silylated polysilicic acid structures bound to the silicon dioxide surface comprise units of the structure $$R_a(OH)_bSiO_c \text{ and } (OH)_dSiO_e,$$

where R can be identical or different and are each a substituted or unsubstituted hydrocarbon radical,
a is 1, 2 or 3,
b is 0, 1 or 2
and c is 1, 2 or 3,
where a+b+c is 4,
d is 0, 1, 2 or 3,
e is 1, 2, 3 or 4
and d+e is 4.

3. Treated silicon dioxide as claimed in claim 2, wherein the molar proportion of the partially or fully silylated polysilicic acid structures bound to the silicon dioxide surface comprising units of the structure $$R_a(OH)_bSiO_c$$

is less than or equal to 75 mol %, but greater than or equal to 25 mol % of all groups containing grafted-on silylating agent radicals.

4. Treated silicon dioxide as claimed in claim 3, wherein the silicon dioxide prior to treatment is a hydrophilic silicon dioxide, and the content of active and acid SiOH on the SiO$_2$ surface of the treated silicon dioxide is less than 25 mol %, based on the total content of active and acid SiOH of the untreated hydrophilic silicon dioxide.

5. Treated silicon dioxide as claimed in claim 2, wherein the molar proportion of the partially or fully silylated polysilicic acid structures bound to the silicon dioxide surface comprising units of the structure $$R_a(OH)_bSiO_c$$

is less than or equal to 75 mol %, but greater than or equal to 25 mol % of all groups containing grafted-on silylating agent radicals.

6. Treated silicon dioxide as claimed in claim 2, wherein the silicon dioxide prior to treatment is a hydrophilic silicon dioxide, and the content of active and acid SiOH on the SiO$_2$ surface of the treated silicon dioxide is less than 25 mol %, based on the total content of active and acid SiOH of the untreated hydrophilic silicon dioxide.

7. Treated silicon dioxide as claimed in claim 1, wherein the silicon dioxide prior to treatment is a hydrophilic silicon dioxide, and the content of active and acid SiOH on the SiO$_2$ surface of the treated silicon dioxide is less than 25 mol %, based on the total content of active and acid SiOH of the untreated hydrophilic silicon dioxide.

8. The treated silicon dioxide of claim 1, wherein said partially or fully silylated polysilicic acid chains include one or more of Z—O—Si[OSiR$_3$]$_3$
Z—O—SiOH[OSiR$_3$]$_2$
Z—O'Si(OH)$_2$[OSiR$_3$]
{Z—O—}$_2$Si[OSiR$_3$]$_2$
{Z—O—}$_2$SiOH[OSiR$_3$]
Z—O—Si[OSiR$_3$]$_2$—O—Si[OSiR$_3$]$_3$
Z—O—SiOH[OSiR$_3$]—O—Si[OSiR$_3$]$_3$
Z—O—Si(OH)$_2$—O—Si[OSiR$_3$]$_3$
Z—O—Si[OSiR$_3$]$_2$—O—SiOH[OSiR$_3$]$_2$
Z—O—Si[OSiR$_3$]$_2$—O—Si(OH)$_2$[OSiR$_3$]
Z—O—SiOH[OSiR$_3$]—O—SiOH[OSiR$_3$]$_2$
Z—O—Si{OSi[OSiR$_3$]$_3$}$_3$
Z—O—SiOH{OSi[OSiR$_3$]$_3$}$_2$, or
Z—O—Si{OSiOH[OSiR$_3$]$_2$}$_3$.

9. The treated silicon dioxide of claim 1, wherein said partially or fully silylated polysilicic acid chains include one or more of Z—O—Si[OSi(CH$_3$)$_3$]$_3$
Z—O—SiOH[OSi(CH$_3$)$_3$]$_2$
Z—O—Si(OH)$_2$[OSi(CH$_3$)$_3$]
{Z—O—}$_2$Si[OSi(CH$_3$)$_3$]$_2$
{Z—O—}$_2$SiOH[OSi(CH$_3$)$_3$]
Z—O—Si[OSi(CH$_3$)$_3$]$_2$—O—Si[OSi(CH$_3$)$_3$]$_3$
Z—O—SiOH[OSi(CH$_3$)$_3$]—O—Si[OSi(CH$_3$)$_3$]$_3$
Z—O—Si(OH)$_2$—O—Si[OSi(CH$_3$)$_3$]$_3$
Z—O—Si[OSi(CH$_3$)$_3$]$_2$—O—SiOH[OSi(CH$_3$)$_3$]$_2$
Z—O—Si[OSi(CH$_3$)$_3$]$_2$—O—Si(OH)$_2$[OSi(CH$_3$)$_3$]
Z—O—SiOH[OSi(CH$_3$)$_3$]—O—SiOH[OSi(CH$_3$)$_3$]$_2$
Z—O—Si{OSi[OSi(CH$_3$)$_3$]$_3$}$_3$
Z—O—SiOH{OSi[OSi(CH$_3$)$_3$]$_3$}$_2$, or
Z—O—Si{OSi[OSiOH(CH$_3$)$_3$]$_2$}$_3$.

10. A toner which contains the silicon dioxide in claim 1.

11. A crosslinkable silicone composition or a silicone elastomer which contains silicon dioxide as claimed in claim 1.

12. A process for preparing silicon dioxide which bears partially or fully silylated polysilicic acid chains on its surface, comprising reacting a silylating agent in molar excess based on silanol groups present on the silicon dioxide, said reacting taking place in the presence of an equimolar amount of water based on the amount of silylating agent, and in the presence of at least one base, for a period of minimally 15 minutes wherein the sum of silanol groups of the silicon dioxide surface (SiOH) and grafted-on silylating agent radicals (SiR$_a$) is greater than the number of silanol groups on the surface of untreated silicon dioxide, where a can be 1, 2 or 3 and R can be identical or different and are each a substituted or unsubstituted hydrocarbon radical.

13. The process for preparing silicon dioxide as claimed in claim 12, wherein oxygen-containing organosilicon compounds are additionally present during the silylation.

14. The process for preparing silicon dioxide as claimed in claim 13, wherein the additional oxygen-containing organosilicon compounds are present in a molar proportion of less than 25%.

15. The process for preparing silicon dioxide as claimed in claim 12, wherein the silylation is carried out at temperatures of from 20° C. to 150° C.

16. A toner which contains the silicone dioxide prepared as claimed in claim 12.

17. A crosslinkable silicone composition or a silicone elastomer which contains silicon dioxide prepared by the process of claim 12.

* * * * *

UNITED STATES PATENT AND TRADEMARK OFFICE
CERTIFICATE OF CORRECTION

PATENT NO. : 6,183,867 B1  
DATED : February 6, 2001  
INVENTOR(S) : Barthel et al.

It is certified that error appears in the above-identified patent and that said Letters Patent is hereby corrected as shown below:

Column 9,  
Line 67, delete "Z-O'Si(OH)$_2$[OSiR$_3$]" and insert -- Z-O-Si(OH)$_2$[OSiR$_3$] --.

Signed and Sealed this

Seventh Day of August, 2001

*Attest:*

NICHOLAS P. GODICI  
*Attesting Officer*     *Acting Director of the United States Patent and Trademark Office*